US008295359B2

(12) United States Patent
Farmer et al.

(10) Patent No.: US 8,295,359 B2
(45) Date of Patent: Oct. 23, 2012

(54) REDUCING DIFFERENTIALS IN VISUAL MEDIA

(75) Inventors: Linda Farmer, San Diego, CA (US); Jon Rolph, San Diego, CA (US)

(73) Assignee: Auratechnic, Inc., San Diego, CA (US)

( * ) Notice: Subject to any disclaimer, the term of this patent is extended or adjusted under 35 U.S.C. 154(b) by 1210 days.

(21) Appl. No.: 12/050,824

(22) Filed: Mar. 18, 2008

(65) Prior Publication Data
US 2009/0238284 A1 Sep. 24, 2009

(51) Int. Cl.
*H04N 7/12* (2006.01)
(52) U.S. Cl. ......... 375/240.24; 375/240.28; 375/240.25; 375/E7.076
(58) Field of Classification Search ............. 375/240.03, 375/240.25, 240.26; 345/89, 690; 348/646, 348/675
See application file for complete search history.

(56) References Cited

U.S. PATENT DOCUMENTS

| | | | | |
|---|---|---|---|---|
| 5,850,473 A | * | 12/1998 | Andersson | 382/165 |
| 6,016,167 A | * | 1/2000 | Brett | 348/646 |
| 6,724,816 B1 | * | 4/2004 | Kim et al. | 375/240.03 |
| 7,379,042 B2 | * | 5/2008 | Chang | 345/89 |
| 7,738,727 B2 | * | 6/2010 | Chang et al. | 382/274 |
| 8,130,845 B2 | * | 3/2012 | Brusnitsyn et al. | 375/240.28 |
| 2003/0085905 A1 | | 5/2003 | Mori et al. | |
| 2003/0137606 A1 | * | 7/2003 | Rumreich et al. | 348/675 |
| 2006/0187357 A1 | | 8/2006 | Satou et al. | |
| 2007/0019003 A1 | | 1/2007 | Imai et al. | |
| 2010/0225658 A1 | * | 9/2010 | Coleman | 345/547 |

FOREIGN PATENT DOCUMENTS

JP 2000-250463 9/2000

OTHER PUBLICATIONS

Sauser, B., "TV for the Visually Impaired," Technology Review, Published by MIT, Monday, Jan. 28, 2008, http://www.technologyreview.com/Infotech/20117?a=f.
Sauser, B., "TV for the Visually Impaired," ABC News, Jan. 28, 2008, http://www.abcnews.go.com/Technology/GadgetGuide/story?id=4201748&page=1.
International Search Report dated Nov. 20, 2009 for PCT/US2009/036681.

* cited by examiner

*Primary Examiner* — Robert Wilson
*Assistant Examiner* — Mohamed Kamara
(74) *Attorney, Agent, or Firm* — Wilson, Sonsini, Goodrich & Rosati (57) ABSTRACT

Provided herein are processes, systems and devices for reducing differentials in visual media. Undesired differentials include undesired contrasts in brightness and/or color. Also described herein are signals, video frames and video streams that have been limited to produce a desired differential. Further described are methods for reducing triggers that can lead to migraines, nausea and neuronal paroxysms in viewers of visual media.

28 Claims, 2 Drawing Sheets

REDUCING DIFFERENTIALS IN VISUAL MEDIA

BACKGROUND OF THE INVENTION

In the U.S., 99% of households possess at least one television. Television is on in the average U.S. home for over 6 hours a day. About 250 billion hours of television are observed in the U.S. each year. 56% of Americans pay for some sort of cable television each year. About 6 million videos are rented daily in the U.S. Viewers of visual media often encounter unexplained migraines, nausea, and headaches.

SUMMARY OF THE INVENTION

Described herein are systems, methods, devices for reducing differentials in visual media. Differentials include differentials in brightness, color or combinations thereof. Also described herein are signals that have been limited to provide reduced differentials in visual media. Further described herein are video frames and video streams that have been limited to provide reduced differentials. Further described herein are methods for reducing the incidence of neuronal paroxysms and other neurological conditions in a viewer of visual media by providing the viewer with a video stream that has been limited to provide reduced differentials.

Provided in certain embodiments herein is a system for reducing differentials in visual media, the system comprising:
a. a module configured to set or a module configured to receive input setting a maximum differential between frame subunits within a video frame;
b. a module configured to compare a plurality of frame subunits within a video frame (n) with one another;
c. a module configured to determine whether one or more frame subunits of video frame (n) differ from one or more other subunit of video frame (n) in an amount that is greater than the maximum differential; and
d. a module configured to limit the one or more frame subunits of frame (n) that differ from one or more other subunits of video frame (n) in an amount that is greater than the maximum differential set to form a limited frame subunit of frame (n).

In some embodiments, the differentials are, by way of non-limiting example, differentials in brightness, color or combinations thereof. In certain embodiments, the maximum differential is automatically set, user set, predetermined, factory set or a combination thereof.

In certain embodiments, each frame subunit comprises less than about 1% of the video frame. In some embodiments, the plurality of frame subunits are decoded from a video frame of a video stream. In some embodiments, the plurality of frame subunits are MPEG macroblocks.

In certain embodiments, a system provided herein further comprises:
a. a module configured to buffer video frame (n) of a video stream; and
b. a module configured to decode video frame (n) into the plurality of frame subunits.

In further or alternative embodiments, the system further comprises a module configured to assemble frame subunits of video frame (n) with at least one limited frame subunit of video frame (n) into an assembled matrix of assembled frame subunits as a corrected video frame (n).

In some embodiments, the limited frame subunit of frame (n) does not differ from one or more non-limited frame subunits of frame (n) in an amount greater than the maximum differential.

Provided in certain embodiments herein is a system for reducing differentials in visual media, the system comprising:
a. a module configured to set or a module configured to receive input setting a maximum differential between a frame subunit of a video frame (n) and a frame subunit of preceding video frame (n-x);
b. a module configured to compare a frame subunit of video frame (n) with a frame subunit of video frame (n-x);
c. a module configured to determine whether the frame subunit of video frame (n) differs from the frame subunit of video frame (n-x) in an amount that is greater than the maximum differential;
d. a module configured to limit a frame subunit of frame (n) that differs from a subunit of video frame (n-x) in an amount that is greater than the maximum differential to form a limited frame subunit of frame (n).

In certain embodiments, video frame (n-x) is a video frame that preceded video frame (n) by x frames. In some embodiments, x is, by way of non-limiting example, 1.

In certain embodiments, the differentials are, by way of non-limiting example, differentials in brightness, color or combinations thereof. In some embodiments, the maximum differential is a maximum differential between a frame subunit of video frame (n) and a frame subunit of video frame (n-x) found in corresponding locations within their respective frames. In some embodiments, the differential is brightness, and the module configured to determine whether the frame subunit of video frame (n) differs in brightness from a frame subunit of video frame (n-x) in an amount that is greater than the maximum brightness differential is configured to determine whether the brightness of frame subunit of video frame (n) is greater than the brightness in the frame subunit of video frame (n-x) in an amount that is greater than the maximum brightness differential.

In certain embodiments, the frame subunit of video frame (n) and the frame subunit of video frame (n-x) that are compared are found in corresponding locations within their respective frames. In some embodiments, the frame subunits are MPEG macroblocks.

In some embodiments, more than one frame subunit of video frame (n) is compared to more than one frame subunit of video frame (n-x), and wherein each frame subunit of video frame (n) is found in a discrete location within video frame (n) and is compared to a frame subunit of video frame (n-x) that is found in a corresponding discrete location within video frame (n-x). In some embodiments, each frame subunit comprises less than about 1% of the corresponding video frame.

In certain embodiments, the frame subunits of video frames (n) and (n-x) are decoded from video frames of a video stream.

In some embodiments, a system provided for herein further comprises a module configured to buffer video frames (n) and (n-x) of a video stream and decoding video frames (n) and (n-x) into a plurality of frame subunits. In further or alternative embodiments, a system described herein further comprises a module configured to assemble frame subunits of video frame (n) with at least one limited frame subunit of video frame (n) into an assembled matrix of assembled frame subunits as a corrected video frame (n).

In some embodiments, the maximum differential is automatically set, user set, predetermined, factory set or a combination thereof.

In certain embodiments, the limited frame subunit of frame (n) does not differ from the frame subunit of frame (n-x) to which it is compared in an amount greater than the maximum differential.

In some embodiments, provided herein is a system for reducing differentials in visual media, the system comprising the modules set forth in the system for reducing intra-frame differentials and the system for reducing inter-frame differentials, as described above.

In certain embodiments, provided herein is a process for reducing differentials in visual media, the process comprising the steps of:
  a. setting a maximum differential between frame subunits within a video frame;
  b. comparing a plurality of frame subunits within a video frame (n) with one another;
  c. determining whether one or more frame subunits of video frame (n) differ from one or more other subunit of video frame (n) in an amount that is greater than the maximum differential;
  d. limiting the one or more frame subunits of frame (n) that differ from one or more other subunits of video frame (n) in an amount that is greater than the maximum differential set to form a limited frame subunit of frame (n).

In some embodiments, the differentials are differentials in, by way of non-limiting example, brightness, color or combinations thereof. In certain embodiments, each frame subunit comprises, by way of non-limiting example, about 256 pixels. In some embodiments, each frame subunit comprises, by way of non-limiting example, less than about 1% of the video frame. In some embodiments, the plurality of frame subunits comprise, are, or are parts MPEG macroblocks In certain embodiments, the plurality of frame subunits are decoded from a video frame of a video stream. In some embodiments, prior to comparing the plurality of frame subunits, the process further comprises buffering video frame (n) of a video stream and decoding video frame (n) into the plurality of frame subunits. In further or alternative embodiments, the process further comprises assembling frame subunits of video frame (n) with at least one limited frame subunit of video frame (n) into an assembled matrix of assembled frame subunits as a corrected video frame (n).

In some embodiments, the maximum differential is automatically set, user set, predetermined, factory set or a combination thereof. In certain embodiments, the limited frame subunit of frame (n) does not differ from one or more non-limited frame subunits of frame (n) in an amount greater than the maximum differential.

In certain embodiments, provided herein is a process for reducing differentials in visual media, the process comprising the steps of:
  a. setting a maximum differential between a frame subunit of a video frame (n) and a frame subunit of preceding video frame (n-x);
  b. comparing a frame subunit of video frame (n) with a frame subunit of video frame (n-x);
  c. determining whether the frame subunit of video frame (n) differs from the frame subunit of video frame (n-x) in an amount that is greater than the maximum differential;
  d. limiting a frame subunit of frame (n) that differs from a subunit of video frame (n-x) in an amount that is greater than the maximum differential to form a limited frame subunit of frame (n).

In some embodiments, video frame (n-x) is a video frame that preceded video frame (n) by x frames. In specific embodiments, x is, by way of non-limiting example, 1.

In some embodiments, the differentials are differentials in, by way of non-limiting example, brightness, color or combinations thereof. In certain embodiments, the maximum differential is a maximum differential between a frame subunit of video frame (n) and a frame subunit of video frame (n-x) found in corresponding locations within their respective frames.

In some embodiments, the frame subunit of video frame (n) and the frame subunit of video frame (n-x) that are compared are found in corresponding locations within their respective frames. In certain embodiments, determining whether the frame subunit of video frame (n) differs in brightness from a frame subunit of video frame (n-x) in an amount that is greater than the maximum brightness differential comprises of determining whether the brightness of frame subunit of video frame (n) is greater than the brightness in the frame subunit of video frame (n-x) in an amount that is greater than the maximum brightness differential.

In some embodiments, more than one frame subunit of video frame (n) is compared to more than one frame subunit of video frame (n-x). In certain embodiments, more than one frame subunit of video frame (n) is compared to more than one frame subunit of video frame (n-x), and each frame subunit of video frame (n) is found in a discrete location within video frame (n) and is compared to a frame subunit of video frame (n-x) that is found in a corresponding discrete location within video frame (n-x).

In certain embodiments, each frame subunit comprises, by way of non-limiting example, about 256 pixels. In some embodiments, each frame subunit comprises, by way of non-limiting example, less than about 1% of the corresponding video frame. In certain embodiments, the frame subunits comprise, are, or are parts of MPEG macroblocks.

In some embodiments, the frame subunits of video frames (n) and (n-x) are decoded from video frames of a video stream. In certain embodiments, prior to comparing the frame subunits, the process further comprises buffering video frames (n) and (n-x) of a video stream and decoding video frames (n) and (n-x) into a plurality of frame subunits. In further or alternative embodiments, the process further comprises assembling frame subunits of video frame (n) with at least one limited frame subunit of video frame (n) into an assembled matrix of assembled frame subunits as a corrected video frame (n).

In some embodiments, the maximum differential is automatically set, user set, predetermined, factory set or a combination thereof. In certain embodiments, the limited frame subunit of frame (n) does not differ from the frame subunit of frame (n-x) to which it is compared in an amount greater than the maximum differential.

In certain embodiments, provided herein is a process for reducing variations of brightness in visual media, the process comprising each of the steps set forth hereinabove.

In some embodiments, provided herein is a signal for transmitting a video frame that comprises frame subunit a has been limited according to any of the processes described herein.

In certain embodiments, provided herein is a device for reducing variations of brightness in visual media, wherein the device:
  a. receives a video stream;
  b. decodes one or more frame subunit from a video frame of the video;
  c. and processes at least one frame subunit according to any process set forth herein.

In some embodiments, the video stream is decoded from a compressed format. In certain embodiments, the video stream is decoded from, by way of non-limiting example, an MPEG format, and wherein the decoded frame subunit from the video frame of the video is an MPEG macroblock. In some embodiments, the device is, by way of non-limiting example, a computer, an in-line conversion box, or digital video recorder.

In some embodiments, the in-line conversion box is selected from, by way of non-limiting example, an in-line high-definition multimedia interface (HDMI) conversion box, an in-line component conversion box and combinations thereof.

In certain embodiments, provided herein is a device on which is stored a video comprising a video frame that has been limited according to any of the processes described herein. In some embodiments, the video is stored in a compressed format. In specific embodiments, the compressed format is, by way of non-limiting example, an MPEG format.

In some embodiments, provided herein is a limited video frame having at least one limited frame subunit, wherein the limited frame subunit does not differ from one or more non-limited frame subunits in an amount greater than a maximum differential. In certain embodiments, the maximum differential is selected from a differential in, by way of non-limiting example, brightness, color or combinations thereof. In some embodiments, provided herein is a limited video frame stored on a readable medium.

In some embodiments, each frame subunit comprises, by way of non-limiting example, about 256 pixels. In certain embodiments, each frame subunit comprises, by way of non-limiting example, less than about 1% of the video frame.

In certain embodiments, the maximum differential is automatically set, user set, predetermined, factory set or a combination thereof.

In some embodiments, provided herein is a plurality of video frames comprising at least one limited video frame as described herein. In certain embodiments, the plurality of video frames are stored on a readable medium.

Provided in certain embodiments herein is a method of reducing or preventing incidences of neuronal paroxysms in an viewer of visual media possessing a plurality of video frames, wherein at least one of the video frames is a limited video frame, and wherein the limited video frame has at least one limited frame subunit, wherein the limited frame subunit does not differ from one or more non-limited frame subunits in an amount greater than a maximum differential.

Provided in certain embodiments herein is a method of reducing or preventing incidences of migraines, epileptic episodes, head aches, irritability, eye strain, nausea or combinations thereof in an viewer of visual media possessing a plurality of video frames, wherein at least one of the video frames is a limited video frame, and wherein the limited video frame has at least one limited frame subunit, wherein the limited frame subunit does not differ from one or more non-limited frame subunits in an amount greater than a maximum differential.

In some embodiments, the maximum differential is selected from a differential in brightness, color or combinations thereof. In some embodiments, each frame subunit comprises, by way of non-limiting example, about 256 pixels. In certain embodiments, each frame subunit comprises, by way of non-limiting example, less than about 1% of the video frame. In some embodiments, the maximum differential is automatically set, user set, predetermined, factory set or a combination thereof.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

Visual media is a source of entertainment throughout the world. Visual media are observed or watched (used interchangeably herein) in a variety of manners, including on television, on a computer monitor, on a pocket-computer device (e.g., an i-Pod), on a movie screen, and the like. Visual media watched on television has a variety of sources including, by way of non-limiting example, live television (received, e.g., by fiber optics, traditional cable, satellite or antennae signal), time shifted television (e.g., using video cassettes, recordable DVDs or digital video recorders (DVR), such as TiVo®), movies (e.g., from pay-per-view, video cassettes, DVDs, Blu-Ray Discs, HD DVD, or Laserdisc). Visual media observed on a computer can include any of the sources observed on a television. Furthermore, visual media observed on a computer includes, by way of non-limiting example, compressed data files that have been stored on a computer or streaming video from an online source.

In certain instances the visual media observed in any manner, including those described herein, possess rapid differentials of, e.g., color and/or brightness. In some instances, the rapid differentials are utilized in order to gain the attention of a viewer of the visual media; in other instances, the rapid differentials are unintended and are an artifact of production of the visual media. In certain instances, these rapid differentials cause neurological events, eye strain, and/or nausea in viewers. In some instances, neurological events include, by way of non-limiting example, migraines, epileptic episodes, irritability and/or motion sickness. Accordingly, provided herein are processes for reducing these rapid differentials in visual media. It is noted, however, that the processes described herein are not limited to such uses.

Thus, in certain embodiments, provided herein are processes for reducing these rapid differentials in visual media. In some embodiments, rapid differentials include, by way of non-limiting example, a rapid increase in brightness of an object, a rapid decrease in brightness of an object, a rapid increase of brightness of an entire frame, a rapid decrease in brightness of an entire frame, rapid increase in brightness of a fraction of a frame, a rapid decrease in brightness of a fraction of a frame, or a combination thereof. Similarly, in certain embodiments, a rapid change in color of an object, a rapid change in color of an entire frame, a rapid change in color of a fraction of a frame, or a combination thereof. In certain embodiments, these changes occur over the course of, by way of non-limiting example, about 1 to about 100 frames, about 1 to about 40 frames, about 1 to about 20 frames, or about 2 to about 7 frames. In some embodiments, changes in brightness are combined with changes in color.

In some specific embodiments, rapid differentials in visual media include, e.g., flashing lights, white-out frames, flare-like objects, white flash, lens flare, burn dissolve, bright spots, rapidly moving bright spots, glowing or brightly burning objects of short duration, or combinations thereof.

In various embodiments, rapid differentials are found within a frame (i.e., intra-frame differentials) and/or between frames (i.e., inter-frame differentials). Thus, in certain embodiments, provided herein is a process of reducing rapid differentials in visual media by comparing frame subunits within a video frame or between frames.

In certain embodiments, provided herein is a process for reducing differentials in visual media, the process comprising the steps of:
  a. setting a maximum differential between frame subunits within a video frame;
  b. comparing a plurality of frame subunits within a video frame (n) with one another;
  c. determining whether one or more frame subunits of video frame (n) differ from one or more other subunit of video frame (n) in an amount that is greater than the maximum differential;
  d. limiting the one or more frame subunits of frame (n) that differ from one or more other subunits of video frame (n) in an amount that is greater than the maximum differential set to form a limited frame subunit of frame (n).

In certain embodiments, a differential between frame subunits is based on an event that causes neurological events, neurological paroxysms, eye strain, nausea, migraines, epileptic episodes, irritability and/or motion sickness in a viewer including, by way of non-limiting example, color and/or brightness. In some embodiments, the maximum differential includes, by way of non-limiting example, an amount that causes a neurological events, eye strain, nausea, migraines, epileptic episodes, irritability and/or motion sickness in a viewer.

In specific embodiments, a maximum differential is, by way of non-limiting example, a change of greater than a 5%, 10%, 15%, 20%, 25%, 30%, 40%, 50%, 60%, 70%, 80%, or 90% lumens or candela. In more specific embodiments, a maximum differential is, by way of non-limiting example, an increase of greater than 5%, 10%, 15%, 20%, 25%, 30%, 40%, 50%, 60%, 70%, 80%, 90%, 100%, 150%, or 200% lumens or candela.

In some specific embodiments, a maximum differential is, by way of non-limiting example, a change in the wavelength ($\lambda$) of the light (color) of greater than about 30 nm, 40 nm, 50 nm, 70 nm, 90 nm, 100 nm, 150 nm, or 200 nm. In certain embodiments, the wavelength compared is the maximum wavelength.

In some embodiments, frame subunits of a frame are selected such that the frame subunits form a grid of the frame, are selected based on shape, color, and/or brightness of one or more component of the frame, or are selected based on some combination thereof. In certain embodiments, a frame subunit comprises, by way of non-limiting example, less than or about 0.01%, 0.05%, 0.1%, 0.5%, 1%, 1.5%, 2%, 3%, 5%, 10%, 15%, or 20%. In some embodiments, the frame subunit comprises less than or about 2, 4, 8, 16, 32, 64, 128, 256, 512, or 1024 pixels. In certain embodiments one or more frame subunit of the video frame is different in shape and/or size from at least one or more other frame subunit of the frame.

In certain embodiments, wherein the plurality of frame subunits are decoded from a video frame of a video stream. In some embodiments, the video stream is received from any source including, by way of non-limiting example, a fiber optic source, a cable source, the internet, or a satellite source (e.g., DirecTV or DISH). In certain embodiments, the video stream is received from a compressed data file on a hard drive or disc (e.g., DVD) including, by way of non-limiting example, MPEG (e.g., MPEG-1, MPEG-2, MPEG-3, MPEG-4, MPEG-7, MPEG-21), AVI, WMV, MOV and the like. In some embodiments, a frame subunit utilized in a process described herein is a or a portion of a macroblock of a compressed digital file (e.g., an MPEG macroblock).

In some embodiments, prior to comparing the plurality of frame subunits, a process described herein further comprises buffering video frame (n) of a video stream and decoding video frame (n) into the plurality of frame subunits.

In further or alternative embodiments, a process described herein further comprises assembling frame subunits of video frame (n) with at least one limited frame subunit of video frame (n) into an assembled matrix of assembled frame subunits as a corrected video frame (n). In some embodiments, a signal comprises corrected video frame (n) is then sent to a receiver, which then displays the corrected video frame. In certain embodiments, the receiver is, by way of non-limiting example, a television, a computer monitor, a digital visual interface (DVI), or a movie projector.

In certain embodiments, the maximum differential is automatically set, user set, predetermined, factory set or a combination thereof.

In certain embodiments, the limited frame subunit of frame (n) does not differ from one or more non-limited frame subunits of frame (n) in an amount greater than the maximum differential. In certain embodiments, the limited frame subunit of frame (n) does not differ from one or more non-limited frame subunits of frame (n) in an amount of greater than the maximum differential, unless the limited frame subunit of frame (n) differs from the frame subunit prior to being limited by more than 90%, 80%, 70%, 60%, 50%, 40%, 30%, or 20%, then the maximum differential is 90%, 80%, 70%, 60%, 50%, 40%, 30%, or 20%, respectively.

In some embodiments, comparing a plurality of frame subunits within a video frame (n) with one another comprises comparing each frame subunit with one or more adjacent frame subunits. In specific embodiments, comparing a plurality of frame subunits within a video frame (n) with one another comprises comparing each frame subunit with each adjacent frame subunit.

In certain embodiments, provided herein is a process for reducing differentials in visual media, the process comprising the steps of:
  a. setting a maximum differential between a frame subunit of a video frame (n) and a frame subunit of preceding video frame (n-x);
  b. comparing a frame subunit of video frame (n) with a frame subunit of video frame (n-x);
  c. determining whether the frame subunit of video frame (n) differs from the frame subunit of video frame (n-x) in an amount that is greater than the maximum differential;
  d. limiting a frame subunit of frame (n) that differs from a subunit of video frame (n-x) in an amount that is greater than the maximum differential to form a limited frame subunit of frame (n).

In certain embodiments, video frame (n-x) is a video frame that preceded video frame (n) by x frames. In some embodiments, x is any integer. In some embodiments, the differential is a rapid flashing of a bright frame of frame subunit. In some embodiments, a screen increases or decreases brightness over the course of about 2 to about 40 frames. In some embodiments, a white flash occurs over the course of about 2 to 7 frames. In certain embodiments, a single white spot grows to fill a screen (lens flare) over about 12 to about 20 frames. In certain embodiments, multiple areas of a screen become white and grow to fill the screen (burn dissolve) over about 12 to about 20 frames. In some embodiments, bright spots resembling flares last for about 1 to about 40 frames. In some embodiments, objects glow or burn with intense brightness and move quickly across the screen over the course of about 1 to about 40 frames. Thus, in various embodiments, provided herein, x is about 1 to about 100, about 1 to about 40, about 1 to about 20, about 10 to about 20, about 12 to about 20, about 1 to about 6, or about 1. In certain embodiments, the differentials are rapid differentials.

As with intra-frame processes described herein, the differentials utilized in the processes described herein include, by way of non-limiting example, brightness, color or combinations thereof.

In some embodiments, the maximum differential includes, by way of non-limiting example, an amount that causes a neurological event, eye strain, nausea, migraines, epileptic episodes, irritability and/or motion sickness in a viewer. In other embodiments, a maximum differential includes an amount that causes the screen to become difficult to see (e.g., due to a sudden decrease in brightness).

In specific embodiments, a maximum differential is, by way of non-limiting example, a change of greater than a 5%, 10%, 15%, 20%, 25%, 30%, 40%, 50%, 60%, 70%, 80%, or 90% lumens or candela. In more specific embodiments, a maximum differential is, by way of non-limiting example, an increase of greater than 5%, 10%, 15%, 20%, 25%, 30%, 40%, 50%, 60%, 70%, 80%, 90%, 100%, 150%, or 200% lumens or candela.

In some specific embodiments, a maximum differential is, by way of non-limiting example, a change in the wavelength ($\lambda$) of the light (color) of greater than about 30 nm, 40 nm, 50 nm, 70 nm, 90 nm, 100 nm, 150 nm, or 200 nm. In certain embodiments, the wavelength compared is the maximum wavelength.

In some embodiments, the frame subunit of video frame (n) and the frame subunit of video frame (n-x) that are compared are found in corresponding locations within their respective frames. In some embodiments, the maximum differential is a maximum differential between a frame subunit of video frame (n) and a frame subunit of video frame (n-x) found in corresponding locations within their respective frames. In some embodiments, the maximum differential is a maximum differential between any frame subunit of video frame (n) and any frame subunit of video frame (n-x).

In some embodiments, determining whether the frame subunit of video frame (n) differs in brightness from a frame subunit of video frame (n-x) in an amount that is greater than the maximum brightness differential consists of determining whether the brightness of frame subunit of video frame (n) is greater than the brightness in the frame subunit of video frame (n-x) in an amount that is greater than the maximum brightness differential.

In some embodiments, more than one frame subunit of video frame (n) is compared to more than one frame subunit of video frame (n-x). In specific embodiments, the more than one frame subunit of video frame (n) is compared to more than one frame subunit of video frame (n-x), wherein each frame subunit of video frame (n) is found in a discrete location within video frame (n) and is compared to a frame subunit of video frame (n-x) that is found in a corresponding discrete location within video frame (n-x).

In some embodiments, frame subunits of a frame are selected such that the frame subunits form a grid of the frame, are selected based on shape, color, and/or brightness of one or more component of the frame, or are selected based on some combination thereof. In certain embodiments, a frame subunit comprises, by way of non-limiting example, less than or about 0.01%, 0.05%, 0.1%, 0.5%, 1%, 1.5%, 2%, 3%, 5%, 10%, 15%, or 20%. In some embodiments, the frame subunit comprises less than or about 2, 4, 8, 16, 32, 64, 128, 256, 512, or 1024 pixels. In certain embodiments one or more frame subunit of the video frame is different in shape and/or size from at least one or more other frame subunit of the frame.

In certain embodiments, wherein the plurality of frame subunits are decoded from a video frame of a video stream. In some embodiments, the video stream is received from any source including, by way of non-limiting example, a fiber optic source, a cable source, the internet, or a satellite source (e.g., DirecTV or DISH). In certain embodiments, the video stream is received from a compressed data file on a hard drive or disc (e.g., DVD) including, by way of non-limiting example, MPEG (e.g., MPEG-1, MPEG-2, MPEG-3, MPEG-4, MPEG-7, MPEG-21), AVI, WMV, MOV and the like. In some embodiments, a frame subunit utilized in a process described herein is a or a portion of a macroblock of a compressed digital file (e.g., an MPEG macroblock).

In certain embodiments, in a process described herein, prior to comparing the frame subunits, the process further comprises buffering video frames (n) and (n-x) of a video stream and decoding video frames (n) and (n-x) into a plurality of frame subunits. In further or alternative embodiments, the process further comprises assembling frame subunits of video frame (n) with at least one limited frame subunit of video frame (n) into an assembled matrix of assembled frame subunits as a corrected video frame (n).

In certain embodiments, the maximum differential is automatically set, user set, predetermined, factory set or a combination thereof.

In certain embodiments, the limited frame subunit of frame (n) does not differ from the frame subunit of frame (n-x) to which it is compared in an amount greater than the maximum differential. In certain embodiments, the limited frame subunit of frame (n) does not differ from the frame subunits of frame (n-x) to which it is compared in an amount greater than the maximum differential, unless the limited frame subunit of frame (n) differs from the frame subunit prior to being limited by more than 90%, 80%, 70%, 60%, 50%, 40%, 30%, or 20%, then the maximum differential is 90%, 80%, 70%, 60%, 50%, 40%, 30%, or 20%, respectively.

In further or alternative embodiments, a process described herein further comprises assembling frame subunits of video frame (n) with at least one limited frame subunit of video frame (n) into an assembled matrix of assembled frame subunits as a corrected video frame (n). In some embodiments, a signal comprises corrected video frame (n) is then sent to a receiver, which then displays the corrected video frame. In certain embodiments, the receiver is, by way of non-limiting example, a television, a computer monitor, a digital visual interface (DVI), or a movie projector.

In some embodiments, provided herein is a process of reducing intra-frame and inter-frame differentials. In some embodiments, the processes of reducing intra-frame and inter-frame differentials are as described above. In certain embodiments, a process of reducing intra-frame differentials comprises:

a. setting a maximum differential between frame subunits within a video frame;
b. comparing a plurality of frame subunits within a video frame (n) with one another;
c. determining whether one or more frame subunits of video frame (n) differ from one or more other subunit of video frame (n) in an amount that is greater than the maximum differential;
d. limiting the one or more frame subunits of frame (n) that differ from one or more other subunits of video frame (n) in an amount that is greater than the maximum differential set to form a limited frame subunit of frame (n);
e. setting a maximum differential between a frame subunit of a video frame (n) and a frame subunit of preceding video frame (n-x);
f. comparing a frame subunit of video frame (n) with a frame subunit of video frame (n-x);
g. determining whether the frame subunit of video frame (n) differs from the frame subunit of video frame (n-x) in an amount that is greater than the maximum differential;
h. limiting a frame subunit of frame (n) that differs from a subunit of video frame (n-x) in an amount that is greater than the maximum differential to form a limited frame subunit of frame (n).

In certain embodiments, the comparison of a frame subunit of video frame (n) with a frame subunit of video frame (n-x) comprises comparing a frame subunit of a video frame (n) that has been limited according to an intra-frame process (e.g., steps b-d) to a frame subunit of video frame (n-x). In some embodiments, the comparison of a frame subunit of video frame (n) with a frame subunit of video frame (n-x) comprises comparing a frame subunit of a video frame (n) that has not been limited according to an intra-frame process to a frame subunit of video frame (n-x), that has been limited according to an intra-frame process (e.g., an equivalent of steps b-d for frame n-x) and/or to an inter-frame process comparing it to a preceding frame (n-x-y), wherein frame (n-x-y) is a video frame that preceded video frame (n-x) by y frames (e.g., an equivalent of steps f-h for frame n-x). In certain embodiments, the comparison of a frame subunit of video frame (n) with a frame subunit of video frame (n-x) comprises comparing a frame subunit of a video frame (n) that has been limited according to an intra-frame process (e.g., steps b-d) to a frame subunit of video frame (n-x), that has been limited according to an intra-frame process (e.g., an equivalent of steps b-d for frame n-x) and/or to an inter-frame process comparing it to a preceding frame (n-x-y), wherein frame (n-x-y) is a video frame that preceded video frame (n-x) by y frames (e.g., an equivalent of steps f-h for frame n-x). In various embodiments, y has a value that is selected from a value set forth for x hereinabove.

In certain embodiments, provided herein is a system comprising:
a. a module configured to set or configured to receive input setting a maximum differential between frame subunits within a video frame;
b. a module configured to compare a plurality of frame subunits within a video frame (n) with one another;
c. a module configured to determine whether one or more frame subunits of video frame (n) differ from one or more other subunit of video frame (n) in an amount that is greater than the maximum differential;
d. a module configured to limit the one or more frame subunits of frame (n) that differ from one or more other subunits of video frame (n) in an amount that is greater than the maximum differential set to form a limited frame subunit of frame (n).

In some embodiments, provided herein is a system comprising:
a. a module configured to set or an input configured to receive input setting a maximum differential between a frame subunit of a video frame (n) and a frame subunit of preceding video frame (n-x);
b. a module configured to compare a frame subunit of video frame (n) with a frame subunit of video frame (n-x);
c. a module configured to determine whether the frame subunit of video frame (n) differs from the frame subunit of video frame (n-x) in an amount that is greater than the maximum differential;
d. a module configured to limit a frame subunit of frame (n) that differs from a subunit of video frame (n-x) in an amount that is greater than the maximum differential to form a limited frame subunit of frame (n).

In certain embodiments, provided herein is a system comprising:
a. a module configured to set or an input configured to receive input setting a maximum differential between frame subunits within a video frame;
b. a module configured to compare a plurality of frame subunits within a video frame (n) with one another;
c. a module configured to determine whether one or more frame subunits of video frame (n) differ from one or more other subunit of video frame (n) in an amount that is greater than the maximum differential;
d. a module configured to limit the one or more frame subunits of frame (n) that differ from one or more other subunits of video frame (n) in an amount that is greater than the maximum differential set to form a limited frame subunit of frame (n);
e. a module configured to set or an input configured to receive input setting a maximum differential between a frame subunit of a video frame (n) and a frame subunit of preceding video frame (n-x);
f. a module configured to compare a frame subunit of video frame (n) with a frame subunit of video frame (n-x);
g. a module configured to determine whether the frame subunit of video frame (n) differs from the frame subunit of video frame (n-x) in an amount that is greater than the maximum differential;
h. a module configured to limit a frame subunit of frame (n) that differs from a subunit of video frame (n-x) in an amount that is greater than the maximum differential to form a limited frame subunit of frame (n).

In certain embodiments, a system described herein is for reducing intra-frame differentials in visual media. In some embodiments, a system described herein comprises modules configured to form one or all of the functions set forth in the processes described above.

In some embodiments, provided herein is a signal transmitting a video frame comprising a video frame that comprises frame subunit that has been limited according to any process described herein or by any system described herein.

Figure 1:
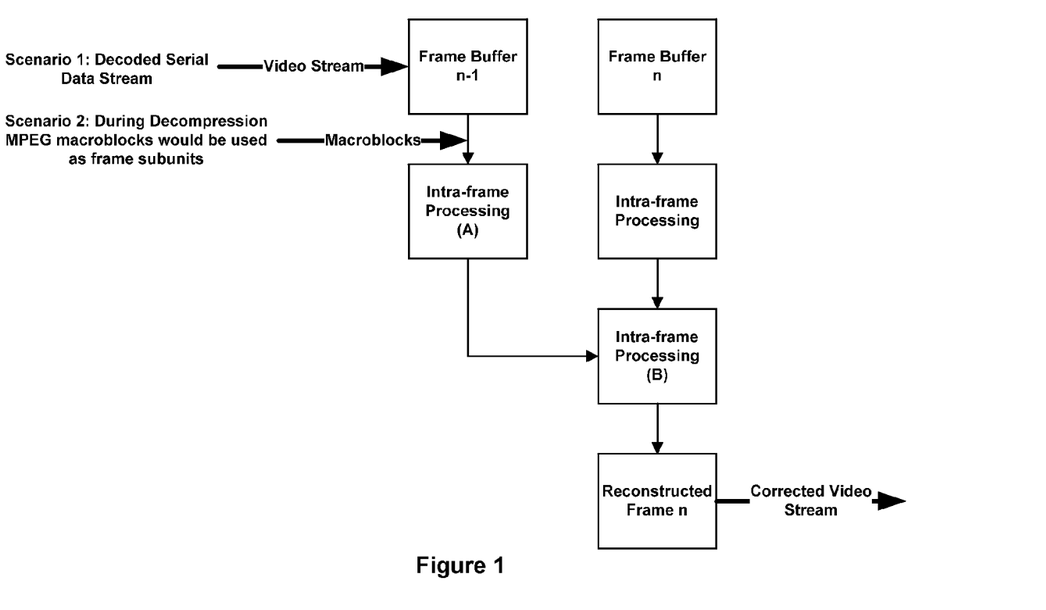
FIG. 1 illustrates a process or system for reducing differentials in visual media.

FIG. 1 illustrates a process or system for reducing differentials in visual media. In some embodiments, a video stream is input and video frames (n) and (n-1) are buffered and processed according to an intra-frame process or by an intra-frame system described herein. In certain embodiments, during decompression, MPEG macroblocks are used in the intra-frame processes or systems described herein. In some embodiments, once frames (n) and (n-1) have been processed according to an intra-frame process or system described herein, frame (n) undergoes inter-frame processing by comparing it or parts of it to frame (n-1). In some embodiments, once inter-frame processing of frame (n) is complete, it is constructed into a limited frame (e.g., if limitation of one or more frame subunit is performed) or reconstructed frame (e.g., if limitation of one or more frame subunit is not necessary). In some embodiments, a corrected video stream is then output.

Figure 2:
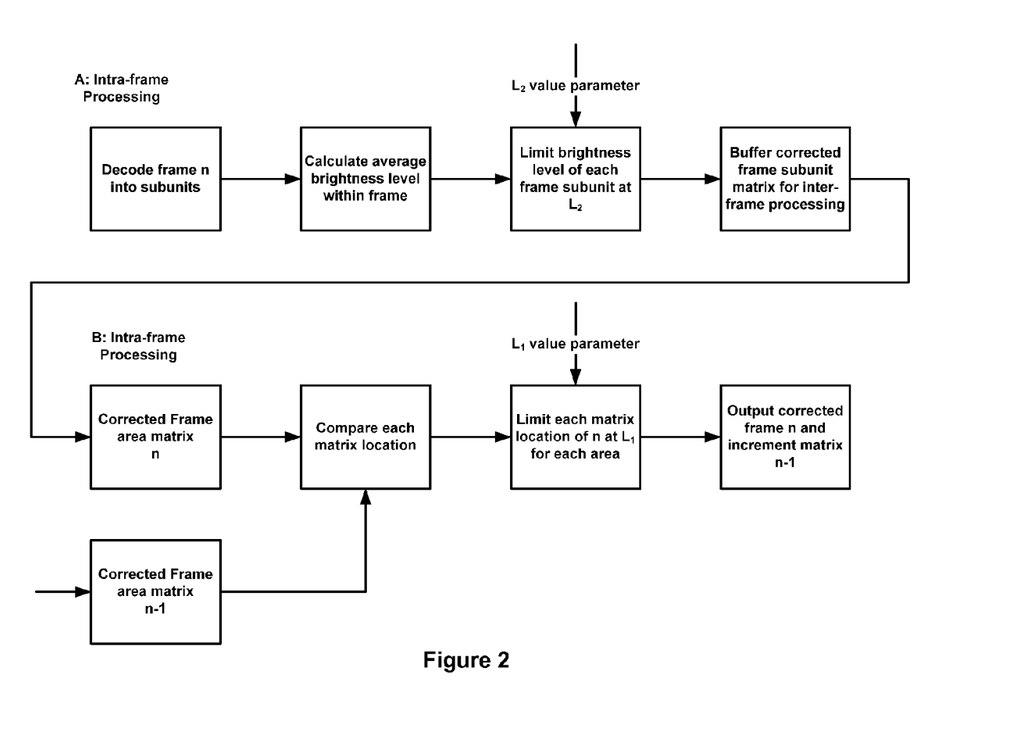
FIG. 2 illustrates a process or system for reducing differentials in visual media.

FIG. 2 illustrates a process or system for reducing differentials in visual media. In some embodiments, a video stream is input and video frame (n) is buffered and decoded into frame subunits. In certain embodiments, frame subunits of video frame (n) are compared to one or more other frame subunits of video frame (n) or to an average of one or more frame subunits of video frame (n). In certain embodiments, a subunit of video frame (n) is limited based on a maximum differential value ($L_2$), e.g., based on brightness and/or color. In some embodiments, the frame subunits of video frame (n) are constructed into a corrected or limited frame (n) (if it has been limited according to $L_2$) and buffered. In certain embodiments, the corrected or limited frame (n) is then compared at each location with a corrected or uncorrected frame (n-1). In other words, in some embodiments, each frame subunit of frame (n) is compared to its respective or corresponding frame subunit of frame (n-1). In certain embodiments, a subunit of video frame (n) is limited based on a maximum differential value between frames ($L_1$), e.g., based on brightness and/or color. In some embodiments, a corrected frame of frame (n) and/or frame (n-1) is then output.

In certain embodiments, provided herein is a device for reducing variations of brightness in visual media, wherein the device:
a. receives a video stream;
b. decodes one or more frame subunit from a video frame of the video;
c. and processes at least one frame subunit according any process set forth herein.

In certain embodiments, the video stream is decoded from a compressed format. In some embodiments, the video stream is decoded from, by way of non-limiting example, MPEG (e.g., MPEG-1, MPEG-2, MPEG-3, MPEG-4), AVI, WMV, or MOV format. In specific embodiments, the video stream is decoded from an MPEG format, and wherein the decoded frame subunit from the video frame of the video is an MPEG macroblock.

In certain embodiments, the device is selected from, by way of non-limiting example, a computer, an in-line conversion box, a video card, a computer monitor, a digital visual interface (DVI), a television, a digital receiver or tuner (e.g., a cable box, fiber optics cable box, or a satellite receiver box), or digital video recorder (e.g., TiVo®). In specific embodiments, the in-line conversion box is selected from an in-line high-definition multimedia interface (HDMI) conversion box, an in-line component conversion box and combinations thereof.

In some embodiments, provided herein is a device on which is stored a video comprising a video frame that has been limited according to any of the processes described herein or by any of the systems provided herein. In certain embodiments, the video is stored in a compressed format. In some embodiments, the video is stored in a compressed format including, by way of non-limiting example, a MPEG (e.g., MPEG-1, MPEG-2, MPEG-3, MPEG-4), AVI, WMV, or MOV format. In a specific embodiment, the compressed format is an MPEG format.

In some embodiments, the device is, by way of non-limiting example, a computer, a hard drive, a portable storage disk, a pocket-computer device (e.g., an iPod® or iPhone), a video cassette, a DVD, a digital video recorders (DVR) (e.g., TiVo®), a Blu-Ray Disc, an HD DVD, or a Laserdisc.

In certain embodiments, provided herein is a limited video frame having at least one limited frame subunit, wherein the limited frame subunit does not differ from one or more non-limited frame subunits in an amount greater than a maximum differential. In some embodiments, the video frame has been processed according to a process described herein or by a system described herein. In some embodiments, the maximum differential is selected from a differential in brightness, color or combinations thereof. In certain embodiments, the differentials in brightness and/or color, and the frame subunit size and shapes are as described hereinabove. In certain embodiments, each frame subunit is as described hereinabove. In some embodiments, the maximum differential is automatically set, user set, predetermined, factory set or a combination thereof.

In certain embodiments, the limited video frame is stored on a readable medium. In some embodiments, the readable medium is a hard drive (e.g., in a computer, or a digital video recorder), a computer, a portable storage disk, a pocket-computer device (e.g., an iPod® or iPhone), a video cassette, a DVD, a digital video recorders (DVR) (e.g., TiVo®), a Blu-Ray Disc, or an HD DVD.

In certain embodiments, provided herein is a plurality of video frames comprising at least one limited video frame. In certain embodiments, a plurality of video frames are stored on a readable medium.

In some embodiments, the processes and/or systems described herein are utilized as an add-on for a web-browser, or as an add-on for a computer based video display standard (e.g., wmv or Quicktime). In certain embodiments, a process or system described herein is a codec for use in editing or production software.

A method of reducing or preventing incidences of and/or the triggering of epileptic episodes, headaches, irritability, eye strain, nausea or combinations thereof in an viewer of visual media possessing a plurality of video frames by replacing at least one video frame viewed by the viewer with a corresponding limited video frame. In some embodiments, each limited video frame has at least one limited frame subunit, wherein the limited frame subunit does not differ from one or more non-limited frame subunits in an amount greater than a maximum differential. In certain embodiments, the limited video frame and/or limited frame subunit are processed according to any process described herein or by a system or device as described herein (including interframe and/or intraframe processing).

In certain embodiments, the maximum differential and/or x values of any of the processes, methods, systems and/or devices described herein are automatically set, user set, predetermined, factory set or a combination thereof. In certain embodiments, when the values are automatically set, the basis for the automatic setting can be any source including, by way of non-limiting example, past user preferences and/or factory settings. In certain embodiments, maximum intra-frame differentials that are automatically set are set, e.g., based on the average brightness of the frame subunits in a frame. In some embodiments, automatic values are set or the values are automatically adjusted based on environmental parameters including, e.g., temperature, humidity, barometric pressure and the like. In some embodiments, factory settings are determined by focus groups, e.g., based on neurological events, eye strain, nausea, migraines, epileptic episodes, irritability and/or motion sickness in the focus group viewers. In certain embodiments, the processes and/or systems provided herein are provided as an addition to video standards (e.g., MPE, DivX) and/or computer video standards (e.g., DirectX).

What is claimed is:

1. A computer processing system for reducing differentials in visual media, the computer processing system comprising:
   (a) a computer processing device;
   (b) a module executed by the computer processing device to set a maximum differential between frame subunits within a video frame or optionally receive input setting a maximum differential between frame subunits within a video frame;
   (c) a module executed by the computer processing device to compare a plurality of frame subunits within a video frame (n) with one another;
   (d) a module executed by the computer processing device to determine whether one or more frame subunits of video frame (n) differ from one or more other subunits of video frame (n) by an amount that is greater than the maximum differential; and
   (e) a module executed by the computer processing device to limit the one or more frame subunits of video frame (n) that differ from the one or more other subunits of video frame (n) by the amount that is greater than the maximum differential set to form a limited frame subunit of frame (n).

2. The system of claim 1, wherein the differentials are differentials in brightness, color or combinations thereof.

3. The system of claim 1, further comprising:
   (f) a module executed by the processing device to buffer video frame (n) of a video stream; and
   (g) a module executed by the processing device to decode the video frame
   (n) into the plurality of frame subunits.

4. The system of claim 1, wherein the system further comprises a module executed by the processing device to assemble frame subunits of the video frame (n) with at least one limited frame subunit of video frame (n) into an assembled matrix of assembled frame subunits as a corrected video frame (n).

5. The system of claim 1, wherein the plurality of frame subunits are MPEG macroblocks.

6. The system of claim 1, wherein the maximum differential is automatically set, user set, predetermined, factory set or a combination thereof.

7. The system of claim 1, wherein the limited frame subunit of frame (n) does not differ from one or more non-limited frame subunits of frame (n) by the amount greater than the maximum differential.

8. A computer processing system for reducing differentials in visual media, the computer processing system comprising:
   (h) a computer processing device;
   (i) a module executed by the computer processing device to set a maximum differential between a frame subunit of a video frame (n) and a frame subunit of preceding video frame (n-x) or optionally receive input setting a maximum differential between a frame subunit of a video frame (n) and a frame subunit of preceding video frame (n-x);
   (j) a module executed by the computer processing device to compare the frame subunit of video frame (n) with the frame subunit of video frame (n-x);
   (k) a module executed by the computer processing device to determine whether the frame subunit of video frame (n) differs from the frame subunit of video frame (n-x) by an amount greater than the maximum differential;
   (l) a module executed by the computer processing device to limit the frame subunit of video frame (n) that differs from the subunit of video frame (n-x) by the amount that is greater than the maximum differential to form a limited subunit of frame (n),
   wherein video frame (n-x) is a video frame that preceded video frame (n) by x frames.

9. The system of claim 8, wherein the differentials are differentials in brightness, color or combinations thereof.

10. The system of claim 9, wherein the differential is brightness and wherein the module is configured to determine whether the frame subunit of video frame (n) differs in brightness from a frame subunit of video frame (n-x) by the amount that is greater than the maximum brightness differential.

11. The system of claim 8, further comprising a module configured to buffer video frames (n) and (n-x) of a video stream and decoding the video frames (n) and (n-x) into a plurality of frame subunits.

12. The system of claim 8, wherein the system further comprises a module executed by the processing device to assemble frame subunits of video frame (n) with at least one limited frame subunit of video frame (n) into an assembled matrix of assembled frame subunits as a corrected video frame (n).

13. The system of claim 8, wherein the frame subunits are MPEG macroblocks.

14. The system of claim 8, wherein the maximum differential is automatically set, user set, predetermined, factory set or a combination thereof.

15. The system of claim 8, wherein the limited frame subunit of frame (n) does not differ from the frame subunit of frame (n-x) to which it is compared by the amount greater than the maximum differential.

16. A computer processing system for reducing differentials in visual media, the computer processing system comprising:
   (m) a computer processing device;
   (n) a module executed by the computer processing device to set a maximum differential between frame subunits within a video frame or optionally receive input setting a maximum differential between frame subunits within a video frame;
   (o) a module executed by the computer processing device to compare a plurality of frame subunits within a video frame (n) with one another;
   (p) a module executed by the computer processing device to determine whether one or more frame subunits of video frame (n) differ from one or more other subunits of video frame (n) by an amount that is greater than the maximum differential;
   (q) a module executed by the computer processing device to limit the one or more frame subunits of video frame (n) that differ from the one or more other subunits of video frame (n) by the amount that is greater than the maximum differential set to form a limited frame subunit of frame (n);
   (r) a module executed by the computer processing device to set a maximum differential between a frame subunit of a video frame (n) and a frame subunit of preceding video frame (n-x) or optionally receive input setting a maximum differential between a frame subunit of a video frame (n) and a frame subunit of preceding video frame (n-x);
   (s) a module executed by the computer processing device to compare the frame subunit of video frame (n) with the frame subunit of video frame (n-x);
   (t) a module executed by the computer processing device to determine whether the frame subunit of video frame (n)

differs from the frame subunit of video frame (n-x) by an amount that is greater than the maximum differential;

(u) a module executed by the computer processing device to limit the frame subunit of video frame (n) that differs from a subunit of video frame (n-x) by the amount that is greater than the maximum differential to form a limited frame subunit of frame (n), wherein the video frame (n-x) is a video frame that preceded video frame (n) by x frames.

17. The system of claim 1, wherein the computer processing device is selected from the group consisting of: computer, pocket computer-device, in-line conversion box, video card, computer monitor, digital visual interface, television, digital receiver, digital tuner, cable box, fiber optics cable box, satellite receiver box, digital video recorder, video cassette, hard drive, portable storage disk, DVD, Blu-Ray disc, HD DVD, or Laserdisc.

18. The system of claim 17, wherein the computer processing device is a television.

19. The system of claim 8, wherein the computer processing device is selected from the group consisting of: computer, pocket computer-device, in-line conversion box, video card, computer monitor, digital visual interface, television, digital receiver, digital tuner, cable box, fiber optics cable box, satellite receiver box, digital video recorder, video cassette, hard drive, portable storage disk, DVD, Blu-Ray disc, HD DVD, or Laserdisc.

20. The system of claim 19, wherein the computer processing device is a television.

21. Non-transitory computer readable storage media encoded with instructions executable by a computing device to create a system for reducing differentials in visual media comprising:

(v) a module configured to set a maximum differential between frame subunits within a video frame or optionally configured to receive input setting a maximum differential between frame subunits within a video frame;

(w) a module configured to compare a plurality of frame subunits within a video frame (n) with one another;

(x) a module configured to determine whether one or more said frame subunits of video frame (n) differ from one or more other subunits of video frame (n) by an amount that is greater than the maximum differential; and (y) a module configured to limit the one or more said frame subunits of video frame (n) that differ from the one or more other subunits of video frame (n) by the amount that is greater than the maximum differential set to form a limit frame subunit of frame (n).

22. The computer readable storage media of claim 21, wherein the media is selected from the group consisting of: hard drive, computer, portable storage disk, pocket-computer device, video cassette, DVD, digit video recorder, Blu-Ray disc, or HD DVD.

23. Non-transitory computer readable storage media encoded with instructions executable by a computing device to create a system for reducing differentials in visual media comprising:

(z) a module configured to set a maximum differential between a frame subunit of a video frame (n) and a frame subunit of preceding video frame (n-x) or optionally configured to receive input setting a maximum differential between a frame subunit of a video frame (n) and a frame subunit of preceding video frame (n-x);

(aa) a module configured to compare the frame subunit of video frame (n) with the frame subunit of video frame (n-x);

(bb) a module configured to determine whether the frame subunit of video frame (n) differs from the frame subunit of video frame (n-x) by an amount greater than the maximum differential;

(cc) a module configured to limit the frame subunit of video frame (n) that differs from the subunit of video frame (n-x) by the amount that is greater than the maximum differential to form a limited subunit of frame (n), wherein video frame (n-x) is a video frame that preceded video frame (n) by x frames.

24. The computer readable storage media of claim 23, wherein the media is selected from the group consisting of: hard drive, computer, portable storage disk, pocket-computer device, video cassette, DVD, digit video recorder, Blu-Ray disc, or HD DVD.

25. A limited video frame, stored on non-transitory computer readable storage media, having at least one limited frame subunit, wherein the limited frame subunit was limited to reduce differentials in visual media by the computer processing system of claim 1, such that it does not differ from one or more non-limited frame subunits by an amount greater than a maximum differential.

26. A limited video frame, stored on non-transitory computer readable storage media, having at least one limited frame subunit, wherein the limited frame subunit was limited to reduce differentials in visual media by the computer processing system of claim 8, such that it does not differ from one or more non-limited frame subunits by an amount greater than a maximum differential.

27. A limited video frame, stored on non-transitory computer readable storage media, having at least one limited frame subunit, wherein the limited frame subunit was limited to reduce differentials in visual media by the system for reducing differentials in visual media of claim 21, such that it does not differ from one or more non-limited frame subunits by an amount greater than a maximum differential.

28. A limited video frame, stored on non-transitory computer readable storage media, having at least one limited frame subunit, wherein the limited frame subunit was limited to reduce differentials in visual media by the system for reducing differentials in visual media of claim 23, such that it does not differ from one or more non-limited frame subunits by an amount greater than a maximum differential.

* * * * *